United States Patent [19]
Wortmann

[11] 3,849,098
[45] Nov. 19, 1974

[54] DEVICE FOR MANUFACTURING DOUBLE LAYER SHEET GLASS

[75] Inventor: Hans-Jurgen Wortmann, Bochum-Lgdr, Germany

[73] Assignee: Flachglas Aktiengesellschaft Delog-Detag, Furth/Bayern, Germany

[22] Filed: Sept. 12, 1973

[21] Appl. No.: 396,456

[30] Foreign Application Priority Data
Sept. 14, 1972 Germany............................ 7233864
Oct. 7, 1972 Germany............................ 2249284

[52] U.S. Cl............................ 65/152, 65/58, 65/273
[51] Int. Cl............................................ C03b 23/24
[58] Field of Search .......... 65/58, 152, 156, 40, 36, 65/273

[56] References Cited
UNITED STATES PATENTS
2,968,895  1/1961  Kilian et al. ..................... 65/152 X
3,078,627  2/1963  Dunipace et al..................... 65/58 X
3,222,153  12/1965  Browne............................. 65/58 X Primary Examiner—Arthur D. Kellogg

[57] ABSTRACT

Device for manufacturing double layer sheet glass by fusing the horizontal cross edges and vertical longitudinal edges of paired, oppositely parallel-spaced single layer sheets supported on a lower guide means and vertically guided through a processing oven by means of an upper guide means, at least one of the two guide means for the glass sheets consisting of individually independent elongated segments, whereby each guide segment exhibits three track-like guide elements disposed in a substantially horizontal plane in oppositely parallel spacing relative to one another.

23 Claims, 5 Drawing Figures

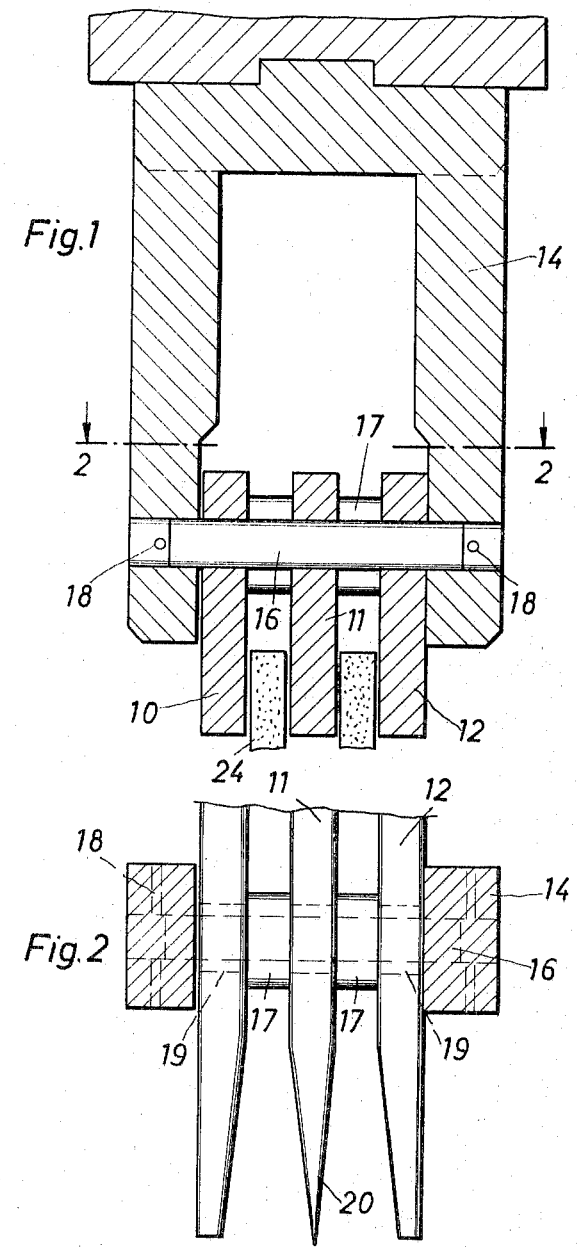

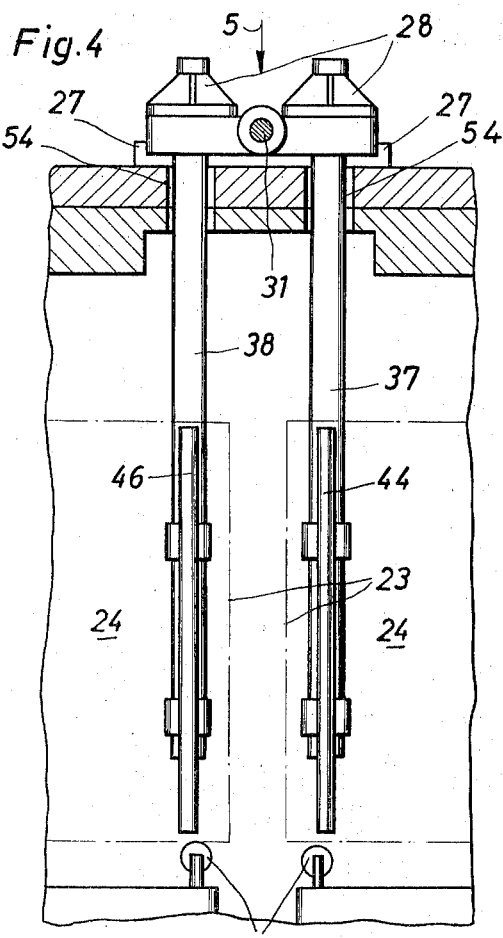
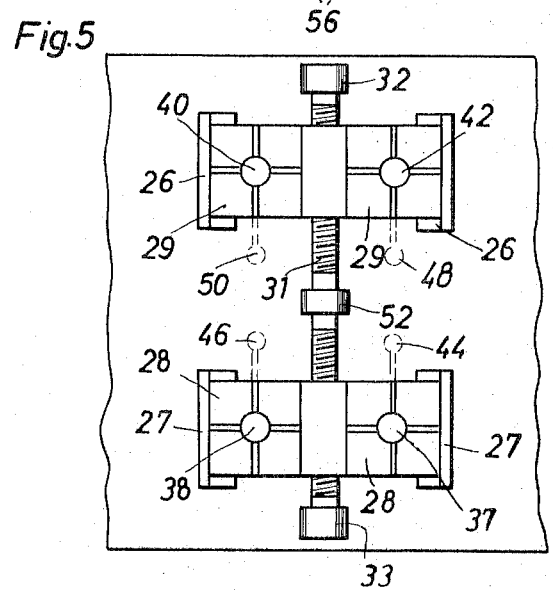

DEVICE FOR MANUFACTURING DOUBLE LAYER SHEET GLASS

FIELD OF THE INVENTION

The present invention relates to a device for manufacturing double layer sheet glass by means of fusing horizontal cross edges and vertical longitudinal edges by individual layers oppositely paired in parallel spacing by a lower guide means and introduced vertically through a processing oven by means of an upper guide means.

SUMMARY OF THE INVENTION

To make double layer sheet glass, pairs of parallel single layer sheets are introduced into a processing oven (a tunnel oven in the practical embodiment) in vertical arrangement relative to a fusing station in which the edges of a pair of single layer sheets are fused together.

The lower layers of the glass sheets are meanwhile normally supported on a lower guide means, which in a known device of this type consists of a gravity roll conveyer. The upper guide means consists of a plurality of guide rollers turning on a vertical axis with spherical peripheral surfaces which engage the topmost edge portions of the glass sheets and thereby support said sheets. In addition, the upper guide means of the known device possesses horizontally rotatable knife rollers, which engage the glass sheets, reaching down between them, and hold them at the desired spacing distance from each other.

Inside the oven, known roller devices are well known to have relatively high trouble incidence and are, in addition, difficult to service. It was therefore recently proposed to utilize guide means consisting of three horizontally interpenetrating strip-like components. Of these components, the two outer components exhibit guide surfaces facing up and down, which are in contact with the glass sheets. The inner component possesses a downward-tapering conical guide surface. In accordance with this embodiment, the guide surfaces possess a linear contact with the upper edges of the sheet. It has been demonstrated in practice, however, that with this guide means (which is substantially simpler, compared with the above-mentioned roller devices) an exact regulation of the spacing between the two sheets may be achieved only with great difficulty. Precise guiding of the sheets is, however, both in the heating zone and in the processing zone, a necessary prerequisite to guarantee flaw-free double layer sheet glass.

A further disadvantage of the known device for manufacturing double layer sheet glass arises from the circumstance that the machine glass utilized in finishing sheets of this type displays (because of the manner in which it was manufactured) certain irregularities of flatness. These irregularities are often so small that they are scarcely discernable prior to the introduction of the single layer sheets into the oven. Only during heating, the single layer sheets warp because of these irregularities--either outwards, in which case they bulge, or they collapse concavely inwards, in which case warping of the newly fused lower or upper horizontal edges (which have normally already been fused) results. Such irregular variations of the spacing between sheets make it impossible to fuse the vertical longitudinal edges in such a way that the edge area will remain within prescribed thickness tolerance, and besides, the seam runs off-center.

The present invention has as its object an improvement of the known double layer sheet glass manufacturing device while avoiding the disadvantages of said device, and it aims to make a device in which the guiding of the glass sheets is embodied in such a way that the desired necessary spacing between sheets may be precisely controlled with an absolute minimum of structural costs. Further, a possibility should be created which is inexpensive and, relative to servicing, undemanding and usable with normal ovens: to obtain vertical seams which are always centered and never exceed tolerance parameters, by fixing the prescribed spacing between individual layers of double layer sheet glass in the area of the longitudinal edges to be fused.

The present invention provides that at least one of the two guide means (namely, the upper and/or lower) for the glass sheets consists of individual independent longitudinal components, in which each guide component exhibits three rail-like guide elements with parallel spacing relative to one another, and arranged in a substantially horizontal plane, in which it is preferably provided that at least the upper guide means is formed in segments of this type.

The segments of a segmented guide means may consist of parallel sheet steel walls and exhibit relative to the overall length of the processing oven only a relatively short length of, for example, one meter.

During operation of such a guide means in accordance with the present invention it was surprisingly demonstrated that despite a surface guiding of the sheets with relatively narrow spacing, which was previously deemed unsuitable and in which the sheets were guided to narrow upper and/or lower edge segments, no scratched spots were observed after fusing of the type that could impair the appearance of double layer sheet glass. For this reason the upper guide means can not only be embodied in this manner, but in addition the knife rollers previously provided at the lower guide means may also be replaced with a guide means of the type described in the present invention. Then, it is also possible that only one (the middle) guide element is added to substitute for the knife roller.

The guide elements of a segmentally embodied inventive guide means are preferably fixed lengthwise to several places arranged relative to parallel spacing in the existing guide means or guide track, in which one of said places is a fixed place. In accordance with one inventive embodiment, the guide elements may be clasped in three places by clamps secured to the guide, or guide track, and held against them by pin-like fastening means which interpenetrate the guide elements and the space bushings arranged between said guide elements, in which the guide elements may be secured to the middle clamp which forms the fixed place and arranged so as to be longitudinally movable relative to the outer clamps.

An easier introduction of the glass sheets moved through the processing oven into the apertures which the guide segments are guiding them can be simplified in that the guide elements, and more specifically the middle guide element, are tapered at their forward ends, whereby said middle guide elements may be tapered into a V-shape at their forward ends and the outer guide elements may be tapered at their forward inner surfaces.

To avoid bulging or collapse of single layer sheets during fusing of the vertical longitudinal edges due to faulty flatness of the single layer sheets, as well as to avoid exceeding thickness tolerance in the edge area and an off-centered alignment of the seam, the present invention further provides that adjacent to the vertical longitudinal edges there are pairs of vertically extending holder elements on opposite sides of the double layer sheet which may be operated in a direction perpendicular to that of the sheet surface and contribute to steadying the outside surface of the single layer sheets.

It has been demonstrated that such an embodiment of the inventive device also permits the avoidance of the above-described disadvantages, if the guide means are not segmentally constructed. It has however been demonstrated that an embodiment as hereinabove described is especially advantageous to realize because in this manner it is possible with machine glass of every normal tolerance to manufacture double layer sheet glass which will be fully satisfactory in meeting the requirements placed upon it.

In accordance with a preferred embodiment of the present invention, the holding elements exhibit pressing rods.

In accordance with the inventive teaching, said holding rods are brought forward against the already horizontally fused sheets—which are led at the over- and underside with a roller distance of (for example) some 20 mm apart—until the crossedges above or beneath, which have a constant mass, are securely and precisely vertically arrested. By this means the single layer sheets, in case they have bulged outwards, are placed parallel to each other so that in the ensuing fusing of the vertical longitudinal edges the maintenance of thickness tolerance and a centered alignment of the seam are guaranteed.

It is a further advantage of the present invention that the holder elements are equipped with suction devices which work on the single layer sheets in such a way as to make it possible to bring inwards-warping sheets back to the suitable external measurement, i.e., the predetermined spacing. At the same time, the guide rods provided by the present invention, which run substantially parallel to the holder elements, extend perpendicularly into the oven, and are movable in a direction perpendicular to the plane of the glass sheets, can be connected up with one or more vacuum suction strips which are actuated by underpressure. If, after the guide rods have come together, underpressure is applied to the suction strips, the single layer sheets are drawn by the suction means to external measurement and thus fixed until the completion of the fusing procedure.

A present inventive embodiment provides that two guide rods are installed in pairs on either side of the plane of sheet glass in a slide which is perpendicularly movable relative to the sheet glass plane. At the same time, the slide is located outside the oven, because operational precision is thus improved. The slides (or also any otherwise-fashioned supports or carriers for the holding elements and/or the guide rods) may either be attached to the oven conveyer rails or to additional braces arranged adjacent to said oven (two or four additional braces are preferable) as mounting sites. From the mountings guide rods, four in all, can be led vertically into the oven, said guide rods being installed in pairs lying opposite to each other relative to the median plane of the sheet glass. At the same time, a pair of the guide rods serve, with the holder elements or pressure rods hooked up with them, to fix the sheets in the area of their forward longitudinal edge, while the second pair serves to fix the spacing between sheets in the area of the rear longitudinal edge.

A preferred embodiment of the present invention is distinquished in that the two guide rods fitting in a slide on one side of the sheet plane are conveyable to the sheet plane simultaneously and together with the guide rods fitting in the other side by means of a spindle arrangement involving both slide arrangements. In this embodiment the spindle axis can be perpendicular to the sheet plane, in which precisionoperating servomotors, which may also (without spindles) directly engage the slide or mount arrangement for the holder elements, permit precise conveyance of the pressing rods and/or suction devices perpendicular to the sheet plane and thus diagonally to the oven axis.

With regard to the length of the guide rods it may be advisable to mount these at their bottom extremity as well, said mounting being achievable in the same fashion as at their upper end.

BRIEF DESCRIPTION OF THE DRAWING

The present invention and its preferred embodiments as well as further characteristics and advantages of the invention are set forth in the claims and in the following description, in which examples of embodiment are further elucidated with reference to partially schematized drawings, in which:

FIG. 1 represents a vertical cross-section through a clamp, which supports track-like guide elements of the upper guide means for guiding the glass sheets in the processing oven adjacent to the extremities of the guide elements;

FIG. 2 is a cross section alone line 2—2 in FIG. 1;

FIG. 4 is a cross section along line 4—4 of FIG. 3; and

FIG. 5 is an overview looking down on the device in accordance with FIGS. 3 and 4 for the manufacture of a slide device for the mounting of guide rods in the direction of arrow 5 in FIGS. 4 or 3.

DETAILED DESCRIPTION OF PREFERRED EMBODIMENT

Figure 3:
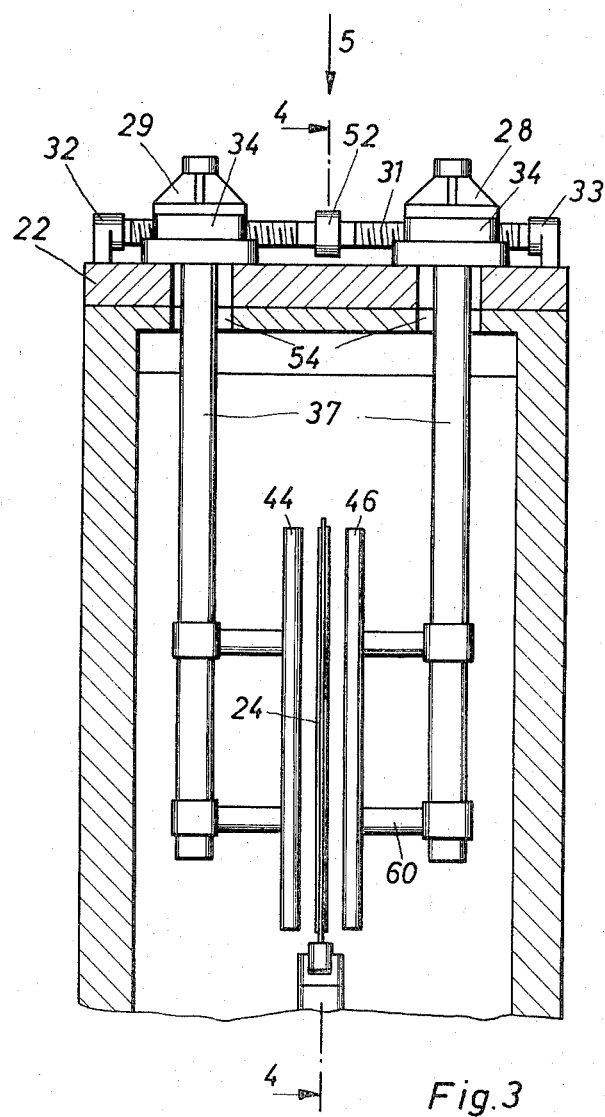
FIG. 3 is a side view drawn in partial cross section of an example of embodiment of the elements relevant to the fixing of the spacing distance between single layer sheets of double layer sheet glass after the fusing of the horizontal cross edges and during the fusing of the vertical longitudinal edges.

FIGS. 1 and 2 represent a cross-section of a device for the manufacture of double layer sheet glass, which is supported through fusing the horizontal cross edges and the vertical longitudinal edges by means of paired and oppositely parallel spacing on a lower guide means consisting of a gravity roller conveyer (not represented in FIGS. 1 and 2). By means of a hereinafter more exhaustively described upper guide means, single layer sheets 24 are vertically guided through a processing oven and manufactured. FIGS. 1 and 2 show a portion of the upper guide means of such a device.

The upper guide means of the device consists substantially of individually independent elongated segments, of which in FIGS. 1 and 2 only a guide segment is represented in cross section. Every guide segment consists of three track-like guide elements 10, 11, 12, which are arranged in oppositely parallel spacing in a substantially horizontal plane and consist of highgrade, parallel-wall flat steel, for example chrome-nickel steel. They exhibit a length of (for example) approximately one meter.

Guide elements 10, 11, and 12 are secured throughout their length to three oppositely parallel sites with a clamp 14, a clamp 14 being set approximately in the middle of their length and two clamps 14 being arranged close to the extremities of guide elements 10, 11 and 12. In FIGS. 1 and 2 only that clamp 14 is shown which is closest to the forward end of guide elements 10, 11 and 12, that is, the end towards which the glass sheets are moved.

Clasped on their sides by the lower end-segments of the shanks of the U-shaped clamps 14, guide elements 10, 11 and 12 of a guide segment of the upper guide means are secured to the clamp shanks by pins 16. Pins 16 penetrate the upper end segments of guide elements 10, 11 and 12, as well as between the space bushings 17 arranged between guide elements 10, 11 and 12 in the upper area. The width of said space bushings 17 is somewhat greater than the thickness of the single layer glass sheets being introduced between the track-like guide elements 10 and 11 or 11 and 12. Pins 16 are secured against axial disalignment by non-represented split pins or wires, which are to be stuck through the boreholes 18 provided in clamps 14.

At the non-represented middle clamp 14 which forms the fixed site the guide elements are (by way of example) secured in such a way that the pertinent pin 16 of said clamp 14 penetrates with very little play the boreholes provided in guide elements 10, 11 and 12 for said pin 16. From this fixed site the track-like guide elements 10, 11 and 12 can expand to either side due to heating by the oven heat. This is facilitated in that the holes provided for pins 16 in the other two outlying clamps 14 are formed as elongated holes 19 (see FIG. 2).

In order to facilitate the introduction of glass sheets 24 moving through the processing oven into the slot between the guide elements 10 and 11 or 11 and 12 that are guiding them, the forward end segments (i.e., those facing the direction of movement of the sheets) of the middle guide element 11 are provided with V-shaped tapered pieces 20. The outside guide elements 10 and 12 are likewise tapered on their inward sides, as may be seen in FIG. 2.

The inventive embodiment described in the above description with reference to FIGS. 1 and 2 effects the desirable spacing with very little structural cost. Furthermore, the inventive guide means is extremely operationally safe and requires virtually no servicing. Moreover, a device equipped with such an upper guide means possesses still further advantages.

FIGS. 3, 4 and 5 represent the relevant elements of the device for fixing the oppositely parallel spacing of the single layer sheets during the fusing of the vertical longitudinal edges, i.e., after the fusing of the horizontal cross edges.

FIG. 3 also represents a segment of oven frame 22. In the upper portion of oven frame 22 a slide guide 26, 27 is disposed on both sides of the middle plane for double layer glass sheet 24 which is to be fused along vertical longitudinal edges 23 (see FIG. 4). In said slide guide 26, 27 a slide 28, 29 is removably disposed horizontally relative to the sheet plane or from it (the sheet plane). Slides 28 and 29 are driven by a spindle 31 applied to a drive motor, said spindle being mounted in mountings 32 and 33 and being engaged with slides 28 and 29 by way of threaded bushings 34 and 36. Slides 28 and 29 can be vertically and horizontally adjusted by means of setscrews.

Guide rods 37, 38, 40, and 41 extend downwards into oven frame 22 and are connected with slides 28 and 29. Said guide rods can, by means of the slide arrangements, be moved towards and away from sheets 24, whereby the lift can amount to (for example) 15 mm. Connected to guide rods 37, 38, 40, and 42 are pressing rods 44, 46, 48, and 50, which extend vertically along the length of the single layer sheets of double layer glass sheets 24, close to their about-to-be-fused longitudinal edges. Additionally, suction devices may also be disposed relative to guide rods 37, 38, 40 and 42, in order to be able to draw inwards-collapsing sheets back to proper external dimensions.

In FIG. 3 a drive wheel 52 is represented, with which spindle 31 is to be driven. For guide rods 37, 38, 40, and 42 (which are vertically and horizontally adjustable) a recess 54 is provided in each of their respective places in the oven cover so as to permit the conveyance of guide rods 37, 38, 40, and 42 and thereby the abutment of holding members or pressing rods 44, 46, 48, and 50 against sheets 24 which can then travel into the fusing area on rollers 56 of the lower guide means. FIG. 3 also shows that guide rods 37, 38, 40 and 42 are connected by vertically and horizontally adjustable supporting bodies 60 with the holding members consisting of pressing rods (and in some cases vacuum suction devices).

The drive of spindle 31 for the conveyance of the holding members may be manual, electric, pneumatic, or hydraulic.

FIG. 5 represents a special embodiment of the spindle drive with drive wheel 52, spindle 31, and the two slide arrangements 28 and 29 in overview corresponding to the representation given in FIGS. 3 and 4. The device works as follows:

After sheets 24 (their upper and lower horizontal cross edges already fused and brought loose on rollers 56) have been conveyed into the fusing area, pressure rods 44 and 46 or 48 and 50 are by means of guide rods 37 and 38 or 40 and 42 brought against sheets 24 until the upper and lower edges, which have a constant mass, are arrested fast and precisely vertical. At the same time the outwards-bulging single layer sheets 24 of double layer glass sheets 24 are disposed in parallel relative to each other, so that in the ensuing fusing of the vertical longitudinal edges the maintenance of thickness tolerance is guaranteed. Simultaneously with pressing rods 44, 46, 48 and 50, the suction devices are applied to the sheets. Finally, the suction means are straightway actuated. After the vertical longitudinal edges have been fused, the vacuum actuation of the suction means is cut off. Pressing rods 44, 46, 48 and 50 and the suction means which constitute the holding members are then immediately transported back by means of guide rods 37, 38, 40, and 42 which are actuated by spindle 31 and slides 28 and 29. Finally, the completely fused double layer glass sheet 24 is conveyed off into the cooling oven.

By this means it is furthermore ensured that both single layer glass sheets at the moment of fusing of longitudinal edges are vertical and parallel relative to each other, so that an even seam and an even sheet-spacing throughout the whole sheet are ensured. As soon as the squeeze rollers which have served for the fusing of the vertical longitudinal edges have reached the lower edges of the sheet, the single layer sheets are completely fixed by pressing rods 44, 46, 48 and 50, which advance against the sheets at the beginning of the vertical burner ascent.

While the above described embodiments constitute the presently preferred modes of practicing the invention, other embodiments or equivalents are within the scope of the invention, which is claimed:

1. Device for manufacturing double layer sheet glass by fusing the horizontal cross edges and vertical longitudinal edges of paired, oppositely parallel-spaced single layer sheets supported on a lower guide means and vertically guided through a processing oven by means of an upper guide means, at least one of the two guide means for the glass sheets consisting of individually independent elongated segments, whereby each guide segment exhibits three track-like guide elements disposed in a substantially horizontal plane in oppositely parallel spacing relative to one another.

2. Device in accordance with claim 1, wherein the guide elements of the inventive segmentally embodied guide means consist of flat steel and at the same time exhibit only a short length of (for example) 1 meter.

3. Device in accordance with claim 2, wherein the guide elements are secured at a plurality of sites along their overall length by the oppositely parallel-spaced sites of a guide means, while one of said sites is a fixed site.

4. Device in accordance with claim 3, wherein the guide elements are clasped in three places by clamps to be secured to the guide means and fixed to these by means of pinlike fixing means, which penetrate the said guide elements and space bushings disposed between them, and wherein the guide elements are disposed fixedly relative to the middle clamp constituting the fixed site and longitudinally movably relative to the outside clamps.

5. Device in accordance with claim 4, wherein the guide elements exhibit longitudinal holes at their areas clasped by the outside clamps, said longitudinal holes being penetrated by the pin-like fixing means of said clamps.

6. Device in accordance with claim 1 wherein the middle guide elements are tapered at their forward ends in a V shape, while the outer guide elements are tapered at their forward inward surfaces.

7. Device in accordance with claim 1, wherein at least the upper guide means is embodied segmentally.

8. Device for manufacturing double layer sheet glass by fusing the horizontal cross edges and vertical longitudinal edges of paired, oppositely parallel-spaced single layer sheets supported on a lower guide means and vertically guided through a processing oven by means of an upper guide means, more specifically in accordance with claim 1, wherein adjacent to the vertical longitudinal edges vertically extending holding members are disposed in pairs on opposite sides of the double layer glass sheet, said holding members being vertically conveyable and transportable into contact with the outer sides of the single layer sheets.

9. Device in accordance with claim 8, wherein the holding members exhibit pressing rods.

10. Device in accordance with claim 8, wherein the holding members display suction devices whose action is applied to the single layer sheets.

11. Device in accordance with claim 10, wherein the suction devices are vacuum-applying suction strips.

12. Device in accordance with claim 9, wherein the holding members are connected with guide rods which run substantially parallel to them, extending perpendicularly into the processing oven and can be conveyed in vertical direction relative to the plane of the sheet glass.

13. Device in accordance with claim 12, wherein the guide rods extend into the oven from above.

14. Device in accordance with claim 12, wherein each pair of guide rods are mounted on either side of the plane of the sheet glass in a slide which is conveyable perpendicularly relative to the plane of the sheet glass.

15. Device in accordance with claim 14, wherein the two slides disposed on either side of the sheet are conveyable simultaneously in the direction toward the plane of the sheet glass by a spindle device with a spindle disposed vertically relative to the plane of the slides.

16. Device in accordance with claim 15, wherein the maximum slide lift along the spindle axis amounts to 2–20 mm (preferably 10–15 mm) and that the lift may be adjusted to a precise value for each individual case.

17. Device in accordance with claim 12, wherein the guide rods are vertically and horizontally adjustable relative to the slides in a plane parallel to that of the sheets in the oven axis.

18. Device in accordance with claim 12, wherein the slides are vertically and horizontally adjustable in a plane parallel to the plane of the sheet glass lying in the oven axis.

19. Device in accordance with claim 8, wherein the holding members may be conveyed toward the sheets manually, electrically, pneumatically, or hydraulically.

20. Device in accordance with claim 9, wherein the pressing rods consist of pipes.

21. Device in accordance with claim 12, wherein the holding members of the guide rods are braced against the conveyer tracks of the oven.

22. Device in accordance with claim 12, wherein the holding members of the guide rods are braced against two or four additional braces disposed adjacent to the oven.

23. Device in accordance with claim 13, wherein the guide rods are mounted at their lower extremities as well.

* * * * *